W. I. LUDLOW.
Fruit Bag.

No. 77,201.

Patented April 28, 1868.

WITNESSES:

INVENTOR:

United States Patent Office.

W. I. LUDLOW, OF CLEVELAND, OHIO.

Letters Patent No. 77,201, dated April 28, 1868.

IMPROVEMENT IN FRUIT-BAG.

*The Schedule referred to in these Letters Patent and making part of the same.*

TO ALL WHOM IT MAY CONCERN:

Be it known that I, W. I. LUDLOW, of Cleveland, in the county of Cuyahoga, and State of Ohio, have invented a new and improved Fruit-Bag; and I do hereby declare that the following is a full, clear, and exact description thereof, which will enable others skilled in the art to make and use the same, reference being had to the accompanying drawings, forming part of this specification.

Similar letters of reference indicate corresponding parts.

This invention relates to a new fruit-bag, which is so arranged that it can be filled on a tree, and emptied into a barrel or other suitable receptacle by the person gathering the fruit, not requiring the aid of a second person to discharge it.

The invention consists in the use of a bag or receptacle, of suitable construction, provided with a bail, and connected at its under side with a rope or string, on which a double hook is secured.

When the bail is hung in the hook, and the latter secured to the branch of a tree, the bag is suspended and ready to be filled. When filled, the hook is released from the branch, and the bag is lowered from the tree by means of the rope, which is still connected with the bail. As soon as the bottom of the bag touches the ground or the interior of a barrel, the rope can be slackened, and its hook will thereby be released from the bail, and when, then, the rope is drawn up, it will turn the bag over, being attached to the under side of the same, and will draw it up bottom up, thereby completely emptying it.

Figure 1:
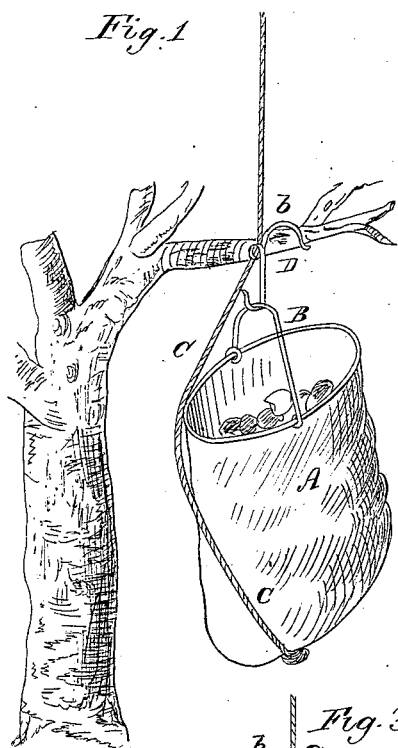
Figure 1 represents a perspective view of my improved fruit-bag when it is in position to be filled.
Figure 3:
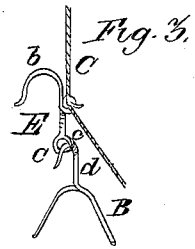
Figure 3 is a detail perspective view, showing a modification in the construction of some parts.

A represents a bag, basket, or other suitable receptacle, provided with a bail, B. C is a rope or cord, secured with one end to the under side of the bag. D is a double hook, fastened in the middle to the cord C, so that its lower hook, $a$, can be fitted under the bail to suspend the bag, while its upper hook, $b$, is laid over the branch of a tree, as is clearly shown in fig. 1.

The bag when thus suspended is ready to be filled.

Figure 2:
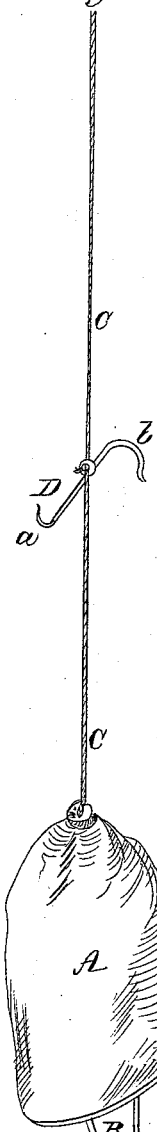
Figure 2 is a similar view of the same, showing it discharged.

Instead of the double hook D, a hook, E, may be used, having an eye, $e$, at its lower end, as shown in fig. 2, in which case a hook, $d$, is formed on the bail B. The bag can thus also be suspended from the hook.

When the bag is filled, the rope C is pulled upwards by the party on the tree, thereby releasing the hook $b$ from the branch of the tree. The bag is then lowered. As soon as it touches the ground, the rope will be slackened, so that the hook $a$ or eye $e$ will be discharged by its own weight from the bail.

When, then, the rope is drawn up, it will turn the bag over, as shown in fig. 2, and will empty it completely. Thus the whole operation of filling and discharging the bag can be performed by the party on the tree without the aid of any person on the ground.

I claim as new, and desire to secure by Letters Patent—

The bag or vessel A, when provided with a bail, B, and when connected at its under side with a rope or cord, C, to which a double hook, D, or its equivalent, E, is attached, all made and operating substantially as herein shown and described.

W. I. LUDLOW.

Witnesses:
A. V. BRIESEN,
ALEX. F. ROBERTS.